(12) United States Patent
Nakamura (10) Patent No.: US 9,903,488 B2
(45) Date of Patent: Feb. 27, 2018

(54) CONTROL VALVE (71) Applicant: KYB Corporation, Tokyo (JP)

(72) Inventor: Yoshinari Nakamura, Kanagawa (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 14/902,361

(22) PCT Filed: Jun. 24, 2014

(86) PCT No.: PCT/JP2014/066695
§ 371 (c)(1),
(2) Date: Dec. 31, 2015

(87) PCT Pub. No.: WO2015/012046
PCT Pub. Date: Jan. 29, 2015

(65) Prior Publication Data
US 2016/0369905 A1 Dec. 22, 2016

(30) Foreign Application Priority Data
Jul. 23, 2013 (JP) ................................. 2013-152577

(51) Int. Cl.
| | |
|---|---|
| *F16K 15/06* | (2006.01) |
| *F16K 15/02* | (2006.01) |
| *F16K 47/02* | (2006.01) |
| *F16K 1/38* | (2006.01) |
| *F16K 47/04* | (2006.01) |
| *B67D 7/36* | (2010.01) |

(52) U.S. Cl.
CPC ............. *F16K 15/063* (2013.01); *F16K 1/38* (2013.01); *F16K 15/025* (2013.01); *F16K 15/026* (2013.01); *F16K 47/02* (2013.01); *F16K 47/04* (2013.01); *B67D 7/36* (2013.01)

(58) Field of Classification Search
CPC ........ F16K 15/063; F16K 47/02; F16K 47/04; F16K 1/38; F16K 15/00; F16K 15/02; F16K 15/021; F16K 15/025; F16K 15/026; F16K 1/385; B67D 7/36
USPC ........................................ 137/540, 542, 543
See application file for complete search history.

(56) References Cited

U.S. PATENT DOCUMENTS

| | | | | |
|---|---|---|---|---|
| 2,601,563 A | * | 6/1952 | Selwyn ................... | F16K 17/04 137/540 |
| 2,755,816 A | | 7/1956 | Collins | |

(Continued)

FOREIGN PATENT DOCUMENTS

| | | |
|---|---|---|
| DE | 10-2011-082728 A1 | 3/2013 |
| FR | 2493926 A1 | 5/1982 |

(Continued)

*Primary Examiner* — Ian Paquette
(74) *Attorney, Agent, or Firm* — Rabin & Berdo, P.C.

(57) ABSTRACT

A control valve includes a seat portion through which the fluid passes, a poppet valve portion configured to move relative to the seat portion, a guide cylinder portion configured to guide the fluid having passed through the seat portion by an inner peripheral surface thereof, a poppet guide portion which is in sliding contact with the inner peripheral surface of the guide cylinder portion and supports the poppet valve portion, and a rectifying slit which is formed on at least one of the inner peripheral surface of the guide cylinder portion and an outer peripheral surface of the poppet guide portion.

11 Claims, 4 Drawing Sheets

(56) References Cited

U.S. PATENT DOCUMENTS

| | | | | |
|---|---|---|---|---|
| 2,840,107 | A | * 6/1958 | Campbell | G05D 7/0133 137/529 |
| 3,288,433 | A | * 11/1966 | Nelson | F16K 1/38 251/317 |
| 5,183,075 | A | 2/1993 | Stein | |
| 8,794,256 | B2 | * 8/2014 | Andrews | F16K 15/021 137/112 |
| 2009/0283157 | A1 | 11/2009 | Hogan | |
| 2014/0053913 | A1 | * 2/2014 | Dickey | F16K 17/04 137/12 |

FOREIGN PATENT DOCUMENTS

| | | | |
|---|---|---|---|
| GB | 1468570 | A | 3/1977 |
| GB | 2116293 | A | 9/1983 |
| JP | S50-054925 | A | 5/1975 |
| JP | S59-135151 | U | 9/1984 |
| JP | S62-147774 | U | 9/1987 |
| JP | S63-049066 | U | 4/1988 |
| JP | H04-004575 | A | 1/1992 |
| JP | 11-013815 | A | 1/1999 |
| JP | H11-351148 | A | 12/1999 |
| JP | 2001-099340 | A | 4/2001 |
| JP | 2007-292148 | A | 11/2007 |
| JP | 2009-287609 | A | 12/2009 |
| JP | 2010-090935 | A | 4/2010 |
| JP | 2011-080571 | A | 4/2011 |
| JP | 5152500 | B2 | 2/2013 |

\* cited by examiner

CONTROL VALVE

TECHNICAL FIELD

The present invention relates to a control valve for controlling the flow of fluid.

BACKGROUND ART

In a fuel filling system for taking out fuel gas from a supply source of high-pressure fuel gas and filling it into a fuel tank, noise may be generated from a control valve such as a check valve interposed in a passage when the fuel gas flows at a high speed in the passage.

As a measure against this, JP2001-99340A discloses a check valve including an air damper in a valve body and configured to suppress the vibration of the valve body by resistance applied by the air damper.

JP2011-80571A discloses a check valve including a guide ring held in sliding contact with a shaft portion of a valve body and configured to suppress the vibration of the valve body by sliding resistance applied by the guide ring.

SUMMARY OF INVENTION

However, in such control valves, a vortex may be generated at a downstream side of the valve body and noise may be generated from a gas flow itself when gas of a high pressure and a large flow rate flows at a high speed.

The present invention aims to reduce noise of a control valve.

According to one aspect of the present invention, a control valve for controlling the flow of fluid includes a seat portion through which the fluid passes; a poppet valve portion configured to move relative to the seat portion; a guide cylinder portion configured to guide the fluid having passed through the seat portion by an inner peripheral surface thereof; a poppet guide portion which is in sliding contact with the inner peripheral surface of the guide cylinder portion and supports the poppet valve portion; and a rectifying slit which is formed on at least one of the inner peripheral surface of the guide cylinder portion and an outer peripheral surface of the poppet guide portion.

DESCRIPTION OF EMBODIMENTS

Hereinafter, embodiments of the present invention are described with reference to the accompanying drawings.

First Embodiment

Figure 1:
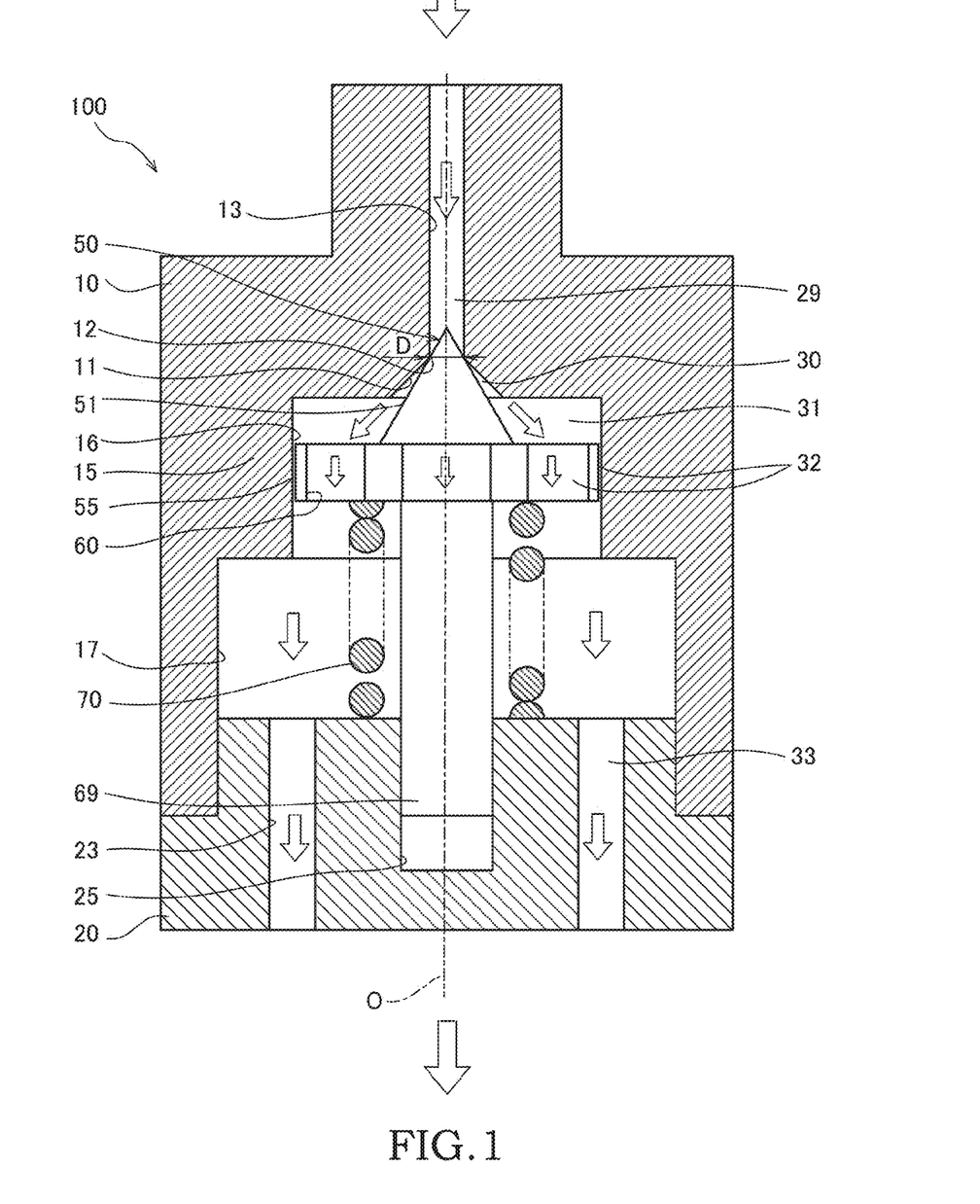
FIG. 1 is a sectional view of a control valve according to a first embodiment of the present invention.

A control valve 100 shown in FIG. 1 is used as a check valve interposed in a passage for fuel gas in a fuel filling system for filling high-pressure fuel gas (hereinafter, referred to as gas) supplied from a supply source into a fuel tank.

The control valve 100 includes a valve housing 10 with an annular seat portion 11 through which the gas passes, a poppet 50 with a poppet valve portion 51 configured to move relative to the seat portion 11 and a spring 70 configured to bias the poppet valve portion 51 in a valve closing direction to come into contact with the seat portion 11.

When the control valve 100 is opened, the poppet 50 moves downward in FIG. 1 against a biasing force of the spring 70 according to an increase in gas pressure introduced from the supply source. In this way, the poppet valve portion 51 is separated from the seat portion 11 and the gas from the supply source flows as indicated by arrows in FIG. 1.

The control valve 100 includes, as a casing thereof, the hollow cylindrical valve housing 10 and a disc-like cover 20 for closing an opening end of the valve housing 10. The poppet 50 and the spring 70 are housed between the valve housing 10 and the cover 20.

An inlet port 13 in the form of a cylindrical surface, the seat portion 11 in the form of a conical surface and an inner peripheral surface 16 in the form of a cylindrical surface of a guide cylinder portion 15 are respectively coaxially formed with respect to a center axis O inside the hollow cylindrical valve housing 10. The inlet port 13 defines an inlet flow passage 29 to which the gas is introduced from the supply source. A poppet flow passage 30 for guiding the gas to a downstream side is defined between the seat portion 11 and the poppet valve portion 51. A poppet downstream passage 31 for guiding the gas is defined between the inner peripheral surface 16 of the guide cylinder portion 15 and the poppet valve portion 51 at a downstream side of the poppet flow passage 30. As just described, the inner peripheral surface 16 of the guide cylinder portion 15 defines the poppet downstream passage 31 to guide the gas having passed through the seat portion 11.

The disc-like cover 20 is fitted and fixed to an opening end of an inner wall portion 17 of the valve housing 10. The cover 20 includes a guide hole 25 open in a central part of the cover 20 and a plurality of outlet ports 23 defining outlet flow passages 33. The guide hole 25 is formed into a cylindrical surface centered on the center axis O. The outlet ports 23 are provided at equal intervals on a circumference centered on the center axis O.

The poppet 50 includes the conical poppet valve portion 51, a disc-like poppet guide portion 55 formed to be connected to a downstream side of the poppet valve portion 51 and a column-shaped rod portion 69 formed to be connected to a downstream side of the poppet guide portion 55. These poppet valve portion 51, poppet guide portion 55 and rod portion 69 are coaxially formed with respect to the center axis O.

The poppet guide portion 55 of the poppet 50 is slidably inserted into the guide cylinder portion 15 of the valve housing 10. The rod portion 69 of the poppet 50 is slidably inserted into the guide hole 25 of the cover 20. In this way, the poppet 50 is supported to move along an axial direction thereof, in which the center axis O extends, relative to the valve housing 10, thereby ensuring the coaxiality of the poppet valve portion 51 with the seat portion 11.

The coiled spring 70 is compressed and interposed between the poppet guide portion 55 and the cover 20 and presses the poppet 50 against the seat portion 11 of the valve housing 10. This causes the poppet guide portion 55 to have a function of receiving the biasing force of the spring 70.

In the control valve 100, the annular poppet flow passage 30 is defined between the seat portion 11 and the poppet valve portion 51 to control a flow rate of the passing gas. As the poppet 50 is displaced along a direction of the center axis O, a flow passage cross-sectional area of the poppet flow passage 30 increases and decreases, thereby controlling the flow rate of the gas passing in the poppet flow passage 30.

The seat portion 11 and the poppet valve portion 51 are each formed to have a tapered vertical cross-sectional shape centered on the center axis O and be enlarged in diameter from an upstream side toward a downstream side.

In a vertical cross-section including the center axis O shown in FIG. 1, the seat portion 11 is formed to be enlarged in diameter while being inclined at a larger angle than the poppet valve portion 51 from the center axis O. An annular seat portion upstream end 12 is formed on an upstream end of the seat portion 11 connected to the inlet port 13.

When the control valve 100 is closed, the poppet valve portion 51 is seated on the seat portion upstream end 12, thereby closing between the inlet flow passage 29 and the poppet flow passage 30.

When the control valve 100 is opened, the poppet valve portion 51 is separated from the seat portion 11, thereby guiding the gas from the supply source to the poppet flow passage 30.

Here, generally, when gas of a high pressure and a large flow rate is introduced, a flow velocity of the gas decreases after increasing in the process of passing between a seat portion and a poppet valve portion in a control valve. Thus, the flow of the gas may become turbulent and a jet flow including a vortex may be generated at a downstream side of the poppet valve portion. High-frequency noise may be generated from such a jet flow or noise may be generated from repeated collision of the poppet valve portion with the seat portion due to a vortex.

As a measure against this, groove-like rectifying slits 32 for suppressing the generation of a vortex are formed between an outer peripheral surface 59 of the poppet guide portion 55 and the inner peripheral surface 16 of the guide cylinder portion 15 in the control valve 100.

The poppet guide portion 55 is formed into a disc-like shape expanding in a direction perpendicularly to the center axis O of the poppet 50 from a downstream end of the poppet valve portion 51. The poppet guide portion 55 includes the outer peripheral surface 59 (see FIGS. 2A, 2B and 2C) held in sliding contact with the guide cylinder portion 15 and a plurality of flow passage grooves 60 open on the outer peripheral surface 59. A plurality of rectifying slits 32 having a flat flow passage cross-sectional shape are defined between the flow passage grooves 60 and the guide cylinder portion 15.

Figure 2A:
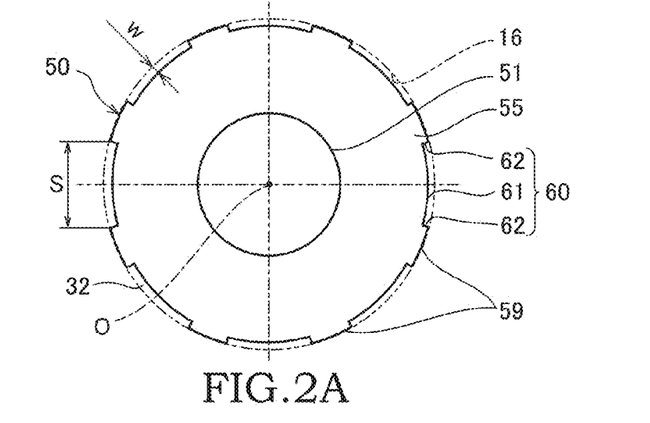
FIG. 2A is a plan view of the control valve according to the first embodiment of the present invention.
Figure 2B:
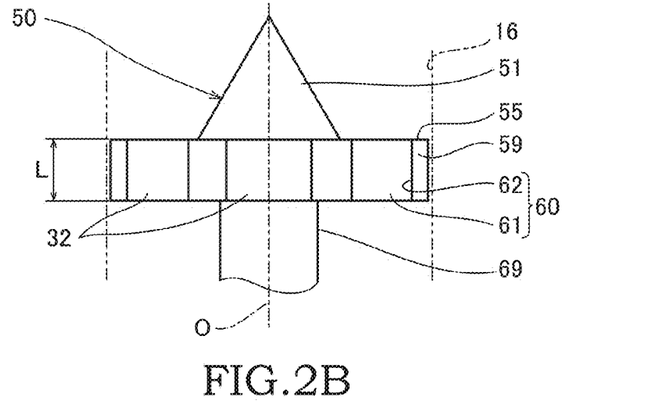
FIG. 2B is a side view of the control valve according to the first embodiment of the present invention.
Figure 2C:
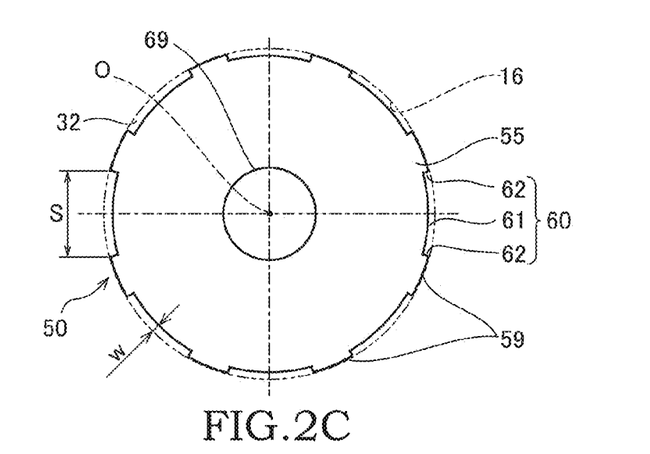
FIG. 2C is a bottom view of the control valve according to the first embodiment of the present invention.

As shown in FIGS. 2A, 2B and 2C, the plurality of rectifying slits 32 are provided at equal intervals in a circumferential direction on the poppet guide portion 55. In this way, fluid pressures of the gas generated in the rectifying slits 32 can be uniformly distributed around the poppet guide portion 55 and reduce sliding resistance of the poppet guide portion 55 to the guide cylinder portion 15.

A groove bottom surface 61 of the flow passage groove 60 is formed into a cylindrical surface coaxial with the guide cylinder portion 15 with respect to the center axis O. In this way, an opening width W, which is a width of each of the rectifying slits 32 along a radial direction of the poppet guide portion 55, is constant in the circumferential direction of the poppet guide portion 55. The opening width W is, in other words, the size of a clearance between the inner peripheral surface 16 of the guide cylinder portion 15 and the groove bottom surface 61 of the flow passage groove 60.

Groove side surfaces 62 of the flow passage groove 60 are formed along the direction of the center axis O of the poppet 50. An opening length S, which is a length of each of the rectifying slits 32 in the circumferential direction, is constant from an upstream side to a downstream side and arbitrarily set to be larger than the opening width W in the radial direction.

A required flow passage cross-sectional area of each of the rectifying slits 32 is obtained by arbitrarily setting the opening length S in the circumferential direction. Thus, resistance applied to the flow of fluid passing through the rectifying slit 32 is suppressed sufficiently low. The total flow passage cross-sectional area of the rectifying slits 32 is set to be larger than a maximum flow passage cross-sectional area of the poppet flow passage 30. In this way, resistance (pressure loss) applied by the rectifying slits 32 to the flow of the gas passing through the poppet flow passage 30 is suppressed to be smaller than resistance applied by the poppet flow passage 30.

Each of the rectifying slits 32 is so formed that the length L along the axial direction is longer than a minimum opening diameter D (see FIG. 1) of the seat portion 11. This causes each of the rectifying slits 32 to have a sufficient flow passage length L and ensures a flow passage length in which the gas flows along the inner peripheral surface 16 of the guide cylinder portion 15 and the groove bottom surface 61 of the flow passage groove 60. Therefore, a rectifying action of suppressing the generation of a vortex in the gas is obtained.

The operation of the control valve 100 is described below.

In a state where the pressure of the gas introduced to the inlet flow passage 29 from the supply source is lower than a set valve opening pressure, the poppet valve portion 51 is held in contact with the seat portion 11 by the biasing force of the spring 70 to close between the inlet flow passage 29 and the poppet flow passage 30.

When the pressure of the gas introduced to the inlet flow passage 29 from the supply source increases beyond the valve opening pressure, the poppet valve portion 51 is separated from the seat portion 11 against the biasing force of the spring 70, allowing communication between the inlet flow passage 29 and the poppet flow passage 30. In this way, the gas from the supply source flows through the inlet flow passage 29, the poppet flow passage 30, the poppet downstream passage 31, the rectifying slits 32 and the outlet flow passages 33 as indicated by arrows in FIG. 1.

Under the condition that the opening of the poppet 50 is small and the flow velocity of the gas flowing in the poppet flow passage 30 is fast, a jet flow including a vortex is generated in the poppet downstream passage 31.

The jet flow flowed into the poppet downstream passage 31 flows through the rectifying slits 32 formed between the guide cylinder portion 15 and the flow passage grooves 60 from the poppet downstream passage 31, whereby the vortex included in that jet flow is rectified.

The generation of high-frequency sound from the jet flow can be prevented by rectifying the vortex generated at the downstream side of the poppet flow passage 30 by the rectifying slits 32. Further, the vibration of the poppet 50 due to a pressure variation caused by the vortex is suppressed and the generation of noise from repeated collision of the poppet valve portion 51 with the seat portion 11 can be prevented.

Figure 3:
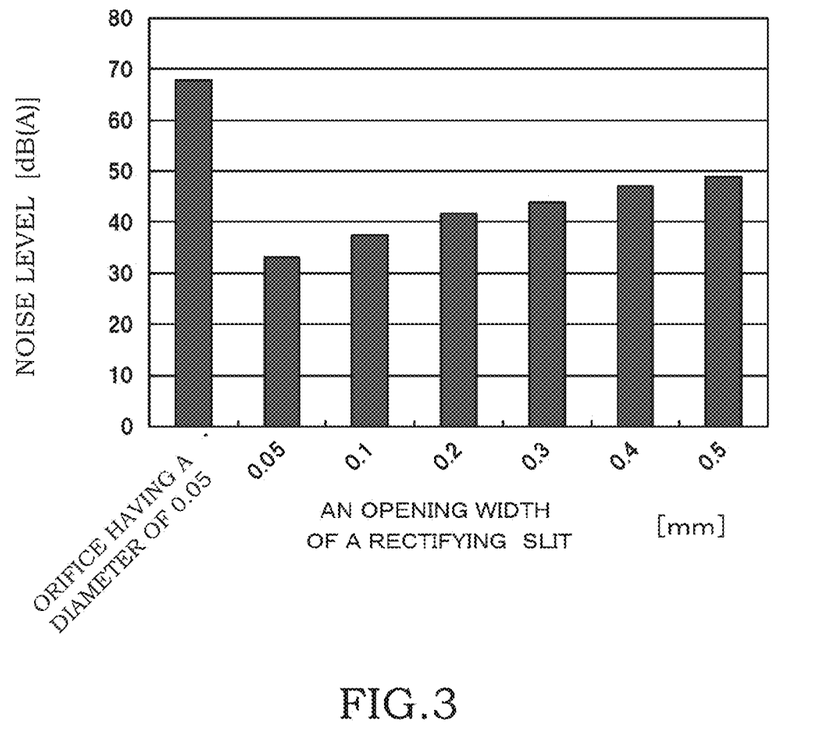
FIG. 3 is a characteristic diagram showing a relationship of an opening width of a rectifying slit and a noise level of the control valve according to the first embodiment of the present invention.

FIG. 3 is a characteristic diagram showing an experimental result of measuring a noise level of the control valve 100 by changing the opening width W of each of the rectifying slits 32. It is understood from this characteristic diagram that the noise level is gradually reduced as the opening width W of each of the rectifying slits 32 is reduced from 0.5 mm. In the characteristic diagram of FIG. 3, a measurement value of a relatively high noise level shown on a leftmost side indicates a comparative example in which orifices having an aperture diameter of 0.5 mm are interposed instead of each of the rectifying slits 32.

Based on the above experimental result, the opening width W of each of the rectifying slits 32 is set at a smallest possible dimension in a processing range of forming the flow passage groove 60 under the condition that the opening width W lies in a range of not larger than 0.5 mm.

According to the above first embodiment, the following functions and effects are exhibited.

[1] The control valve 100 includes the seat portion 11 through which the gas (fluid) passes, the poppet valve portion 51 configured to move relative to the seat portion 11, the guide cylinder portion 15 configured to guide the gas having passed through the seat portion 11 by the inner peripheral surface 16 thereof, the poppet guide portion 55 which is in sliding contact with the inner peripheral surface 16 of the guide cylinder portion 15 and supports the poppet valve portion 51, and the rectifying slits 32 which are formed on the outer peripheral surface 59 of the poppet guide portion 55. Thus, a vortex generated in the flow of the gas passing between the seat portion 11 and the poppet valve portion 51 is rectified by passing through the rectifying slits 32. In this way, noise of the control valve 100 due to the vortex can be reduced.

[2] Each of rectifying slits 32 is so formed that the opening width W in the radial direction of the poppet guide portion 55 is smaller than the opening length S in the circumferential direction of the poppet guide portion 55. Thus, in the control valve 100, it is possible to achieve both an action of rectifying the vortex by setting the small opening width W in the radial direction and a reduction of resistance applied to the flow of the gas by setting the large opening length S in the circumferential direction.

[3] Each of rectifying slits 32 is so formed that the length L in the axial direction of the poppet guide portion 55 is larger than the minimum opening diameter D of the seat portion 11. Thus, in the control valve 100, a flow passage length necessary to rectify the fluid flowing through the rectifying slits 32 is ensured and the generation of the vortex in the jet flow flowing out to the downstream side from the poppet flow passage 30 is suppressed.

[4] A plurality of rectifying slits 32 are formed and provided at equal intervals in the circumferential direction on the poppet guide portion 55. Thus, in the control valve 100, the pressure generated in each rectifying slit 32 can be uniformly distributed around the poppet guide portion 55 and reduce sliding resistance of the poppet guide portion 55 to the guide cylinder portion 15.

Second Embodiment

Figure 4A:
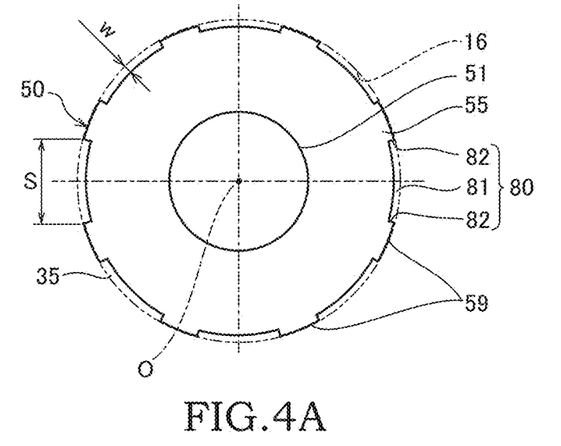
FIG. 4A is a plan view of a control valve according to a second embodiment of the present invention.
Figure 4B:
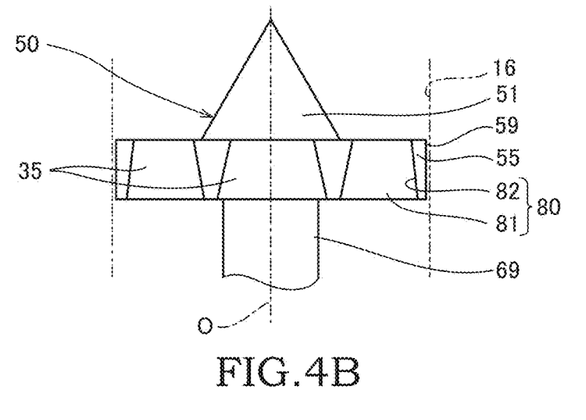
FIG. 4B is a side view of the control valve according to the second embodiment of the present invention.
Figure 4C:
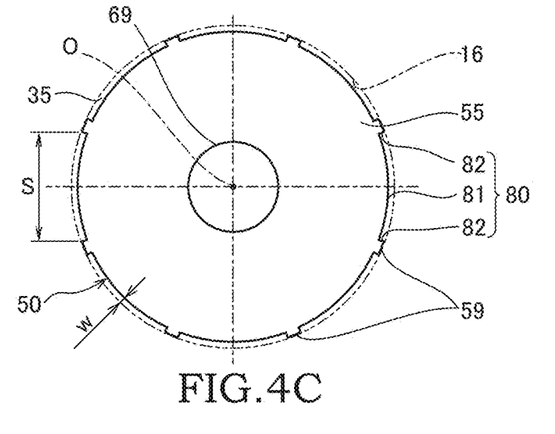
FIG. 4C is a bottom view of the control valve according to the second embodiment of the present invention.

Next, a second embodiment of the present invention is described with reference to FIGS. 4A, 4B and 4C. The following description is centered on points of difference from the first embodiment and the same components as those of the control valve of the above first embodiment are denoted by the same reference signs and not described.

In the control valve 100 according to the above first embodiment, each of the rectifying slits 32 is so formed that the opening length S thereof in the circumferential direction is constant from the upstream side to the downstream side. Contrary to this, in a control valve according to the second embodiment, each of the rectifying slits 35 is so formed that an opening length S thereof in a circumferential direction becomes gradually larger from an upstream side to a downstream side.

A flow passage groove 80 defining each of the rectifying slits 35 includes a groove bottom surface 81 in the form of a cylindrical surface and a pair of groove side surfaces 82 connected to both ends of the groove bottom surface 81 and extending toward an outer peripheral surface 59 of a poppet guide portion 55.

The groove side surfaces 82 of the flow passage groove 80 are formed to be inclined with respect to a center axis O of the poppet guide portion 55. The opening length S of each of the rectifying slits 35 in the circumferential direction of the poppet guide portion 55 changes with respect to a direction of the center axis O. This causes a flow passage cross-sectional area of each of the rectifying slits 35 perpendicular to the center axis O of the poppet guide portion 55 to become gradually larger from the upstream side to the downstream side.

According to the above second embodiment, the functions and effects [1] to [4] are exhibited similarly to the first embodiment and, in addition, the following function and effect are exhibited.

[5] The flow passage cross-sectional area of each of the rectifying slits 35 becomes gradually larger from the upstream side to the downstream side. Thus, in the control valve, a pressure of fluid flowing through each of the rectifying slits 35 is gradually reduced to enhance an effect of rectifying the flow of the fluid and suppress resistance applied to the flow of gas.

Although the opening length S of each of the rectifying slits 35 in the circumferential direction is set to become gradually larger from the upstream side to the downstream side in the second embodiment, an opening width W of each of the rectifying slits 35 in a radial direction may be set to become gradually larger from the upstream side to the downstream side with the opening length S set constant. That is, each of the rectifying slits 35 has only to be set such that the flow passage cross-sectional area perpendicular to the center axis O of the poppet guide portion 55 becomes gradually larger from the upstream side to the downstream side.

Embodiments of this invention were described above, but the above embodiments are merely examples of applications of this invention, and the technical scope of this invention is not limited to the specific constitutions of the above embodiments.

For example, in each of the above embodiments, the flow passage grooves 60, 80 defining the rectifying slits 32, 35 are formed on the poppet guide portion 55. Without limitation to this, the flow passage grooves defining the rectifying slit may be formed on the guide cylinder portion 15.

Further, the control valve 100 of each of the above embodiments is used as a check valve interposed in the passage for fuel gas in the fuel filling system. Without limitation to this, the control valve 100 may be used as a check valve or a relief valve interposed in a circuit, in which gas of a high pressure and a large flow rate flows, in another machine or facility. Furthermore, the fluid flowing through the control valve 100 is not limited to the fuel gas and may be another gas or liquid.

This application claims priority based on Japanese Patent Application No. 2013-152577 filed with the Japan Patent Office on Jul. 23, 2013, the entire contents of which are incorporated into this specification.

The invention claimed is:

1. A control valve for controlling the flow of fluid, comprising:
  a seat portion through which the fluid passes, the seat portion having a cone shape formed about a center axis of the control valve;
  a poppet valve portion configured to move relative to the seat portion, a poppet flow passage being defined between the seat portion and the poppet valve portion that is located within the seat portion in a plane perpendicular to the center axis, an amount of a flow of the fluid through the poppet flow passage being adjusted by a position of the poppet valve portion;
  a guide cylinder portion configured to guide the fluid having passed through the seat portion by an inner peripheral surface thereof;
  a poppet guide portion in sliding contact with the inner peripheral surface of the guide cylinder portion and supporting the poppet valve portion; and
  a plurality of rectifying slits formed on at least one of the inner peripheral surface of the guide cylinder portion and an outer peripheral surface of the poppet guide portion, a total cross-sectional area of a flow passage defined by the plurality of rectifying slits being greater than a cross-sectional area of the poppet flow passage at a maximum flow.

2. The control valve according to claim 1, wherein:
  each of the rectifying slits has an opening width in a radial direction and an opening length in a circumferential direction, the opening width being smaller than the opening length.

3. The control valve according to claim 1, wherein:
  each of the rectifying slits has a length in an axial direction greater than a minimum opening diameter of the seat portion.

4. The control valve according to claim 1, wherein:
  the rectifying slits are spaced from each other at equal intervals in a circumferential direction.

5. The control valve according to claim 1, wherein:
  a cross-sectional area of each of the rectifying slits is gradually enlarged from an upstream side to a downstream side.

6. The control valve according to claim 1, wherein a first cross-sectional area at an uppermost end of the seat portion is smaller than a second cross-sectional area at a lowermost end of the seat portion, the lowermost end of the seat portion being at a junction with the guide cylinder portion, the guide cylinder portion having a third cross-sectional area that is greater than the second cross-sectional area of the seat portion.

7. A control valve for controlling the flow of fluid, comprising:
  a seat portion through which the fluid passes, the seat portion having a cone shape that has a diameter increasing in a downstream direction with respect to the flow of the fluid, and having an annular seat portion upstream end that is a starting point from which the diameter starts to increase, the seat portion being formed about a center axis of the control valve;
  a poppet valve portion configured to move relative to the seat portion, a poppet flow passage being defined between the seat portion and the poppet valve portion that is located within the seat portion in a plane perpendicular to the center axis, an amount of a flow of the fluid through the poppet flow passage being adjusted by a position of the poppet valve portion, the poppet valve portion having a cone shape that has a diameter increasing in a downstream direction with respect to the flow of the fluid, and being configured to seat on the annular seat portion upstream end of the seat portion, an apex angle of the cone shape of the seat portion being greater than an apex angle of the cone shape of the poppet valve portion;
  a guide cylinder portion configured to guide the fluid having passed through the seat portion by an inner peripheral surface thereof;
  a poppet guide portion in sliding contact with the inner peripheral surface of the guide cylinder portion and supporting the poppet valve portion; and
  a plurality of rectifying slits formed on at least one of the inner peripheral surface of the guide cylinder portion and an outer peripheral surface of the poppet guide portion, a total cross-sectional area of a flow passage defined by the plurality of rectifying slits being larger than a cross-sectional area of the poppet flow passage at a maximum flow.

8. The control valve according to claim 7, wherein a first cross-sectional area at an uppermost end of the seat portion is smaller than a second cross-sectional area at a lowermost end of the seat portion, the lowermost end of the seat portion being at a junction with the guide cylinder portion, the guide cylinder portion having a third cross-sectional area that is greater than the second cross-sectional area of the seat portion.

9. A control valve for controlling the flow of fluid, comprising:
  a seat portion through which the fluid passes, the seat portion having a cone shape formed about a center axis of the control valve;
  a poppet valve portion configured to move relative to the seat portion, a poppet flow passage being defined between the seat portion and the poppet valve portion that is located within the seat portion in a plane perpendicular to the center axis, an amount of a flow of the fluid through the poppet flow passage being adjusted by a position of the poppet valve portion;
  a guide cylinder portion configured to guide the fluid having passed through the seat portion by an inner peripheral surface thereof;
  a poppet guide portion in sliding contact with the inner peripheral surface of the guide cylinder portion and supporting the poppet valve portion; and
  a plurality of rectifying slits formed on at least one of the inner peripheral surface of the guide cylinder portion and an outer peripheral surface of the poppet guide portion, a total cross-sectional area of a flow passage defined by the plurality of rectifying slits being greater than a cross-sectional area of the poppet flow passage at a maximum flow, the plurality of rectifying slits being formed between the inner peripheral surface of the guide cylinder portion and the outer peripheral surface of the poppet guide portion, a cross-sectional area of each of the plurality of rectifying slits is gradually enlarged from an upstream side to a downstream side.

10. The control valve according to claim 9, wherein a cross-sectional area of an uppermost end of the poppet guide portion and a cross-sectional area of a lowermost end of the poppet guide portion have an approximately same size.

11. The control valve according to claim 9, wherein a first cross-sectional area at an uppermost end of the seat portion is smaller than a second cross-sectional area at a lowermost end of the seat portion, the lowermost end of the seat portion being at a junction with the guide cylinder portion, the guide cylinder portion having a third cross-sectional area that is greater than the second cross-sectional area of the seat portion.

\* \* \* \* \*